(12) United States Patent
Chen et al.

(10) Patent No.: US 6,728,118 B1
(45) Date of Patent: Apr. 27, 2004

(54) HIGHLY EFFICIENT, TIGHTLY REGULATED DC-TO-DC CONVERTER

(75) Inventors: Qing Chen, Plano, TX (US); Victor Ke-Ji Lee, Plano, TX (US)

(73) Assignee: Innoveta Technologies, Inc., Plano, TX (US)

( * ) Notice: Subject to any disclaimer, the term of this patent is extended or adjusted under 35 U.S.C. 154(b) by 0 days.

(21) Appl. No.: 10/293,722

(22) Filed: Nov. 13, 2002

(51) Int. Cl.[7] .......................... H02M 3/335; H02M 7/44
(52) U.S. Cl. ............................................ 363/24; 363/98
(58) Field of Search .............................. 363/24, 25, 17, 363/98

(56) References Cited

U.S. PATENT DOCUMENTS

| | | | | |
|---|---|---|---|---|
| 5,138,249 A | * | 8/1992 | Capel ........................ | 323/283 |
| 5,590,032 A | * | 12/1996 | Bowman et al. ............. | 363/15 |
| 5,625,541 A | * | 4/1997 | Rozman .................. | 363/21.06 |
| 5,907,481 A | * | 5/1999 | Svardsjo .................... | 363/25 |
| 6,567,284 B2 | * | 5/2003 | Huang ......................... | 363/98 |
| 6,618,274 B2 | * | 9/2003 | Boylan et al. ................ | 363/17 |

\* cited by examiner

Primary Examiner—Bao Q. Vu
(74) Attorney, Agent, or Firm—David W. Carstens; Carstens Yee & Cahoon, LLP

(57) ABSTRACT

The invention presents a highly efficient, tightly regulated DC-to-DC converter which can be used in various applications, especially multiple output converters. The converter uses a buck converter to produce an intermediate bus voltage. A current-fed double ended circuit, such as bridge or push-pull circuit, couples to the buck converter to provide power to outputs. The double ended circuit operates at about 50% duty. The secondary output filter inductor is not required. With 50% duty cycle operation, the secondary rectifiers are easily controlled by either a self-driven or an external driven circuit. The secondary windings can also be stacked up to simplify the transformer design. In addition, bias voltages needed for control circuitry can also be obtained by adding extra windings to the power transformer and extra rectifier devices.

32 Claims, 9 Drawing Sheets

A DC/DC converter formed by a buck converter followed by a full-bridge converter.

A DC/DC converter formed by a buck converter followed by a full-bridge converter.

A DC/DC converter formed by a buck converter followed by a push-pull converter.

HIGHLY EFFICIENT, TIGHTLY REGULATED DC-TO-DC CONVERTER

TECHNICAL FIELD OF THE INVENTION

The present invention relates to a DC-to-DC converter that converts a first input voltage into a first and second output voltage. The converter is very efficient and tightly regulates the output voltages.

BACKGROUND TO THE INVENTION

As supply voltages required for new silicon chips lower, voltages needed to power up these chips perforates to many different levels in modem computer, communication, networking, and data storage systems. As a result, the power supply modules take more and more internal space of a electronic system. Even in a electronic system using distributed power architecture, the board space taken by the power supplies increases rapidly although the power supply modules+ size and volume have reduced drastically. For many applications, it is more efficient and economical to use multiple output converters in place of two or more power modules.

A traditional way of designing multiple-output converters is to use a multiple winding transformer to provide several outputs. The topologies are often flyback or buck type topologies, either forward or double ended circuits such as bridge or push-pull circuits. FIGS. 1 and 2 shows a multiple-output converter implemented using a flyback and forward converter respectively.

Referring to FIG. 1, a power converter 100 is shown having a single input voltage 102 and a first and second output voltage 104, 106. A switch 108 controls the flow of current to a power transformer 110. The power transformer 110 has a primary winding 112 and a first secondary winding 114 and a second secondary winding 116.

The converter 100 is also known as a "forward converter." It uses a pair of rectifying diodes 118, 120. A certain amount of voltage is lost across the rectifying diodes. Indeed, one of the drawbacks of prior art converters involves the number of components used and the voltage losses across those components. The converter 100 also has a pair of freewheeling diodes 122, 124.

FIG. 2 is a multiple-output converter 200 also having an input voltage 202 and a first and second output voltage 204, 206. A switch 208 controls the flow of current to a power transformer 210. The power transformer 210 has a primary winding 212 and a first secondary winding 214 and a second secondary winding 216. It also uses a pair of rectifying diodes 218, 220.

Both prior art converters 100, 200 have significant limitations. First, both are known to have poor cross regulation. In other words, the output voltages vary widely, especially when loads are at extreme conditions, i.e., one operating at full load and the other at light load. In the flyback multiple output converter the output cross regulation depends on the parasitics of the power transformer and the voltage drop across the rectifier diodes [218, 220] In the forward multiple output converter, each output needs an inductor to smooth the output ripple. The inductor results in a power loss especially for low voltage, high current applications. The voltage drops across the output inductors and output rectifiers also have adverse effects on the output cross regulation. Further, each output power stage has its own secondary transformer windings, output inductors, and output rectifiers. If each secondary winding is required to deliver the full power, all the components are sized to handle the full power. Therefore under extreme operation conditions, or one output operating at the full load while the other operating at the light load, the lightly loaded part of the circuit is not participating and hence the circuit components are under utilized.

Since the above circuits are relatively easy to implement, they have been used in the industry for years, especially in applications where output voltages are allowed to vary over a certain range such as PC power supplies. Many power supply designers are familiar with the topologies and understand design trade-off. They developed various methods to deal with the cross regulation issue caused by variations of voltage drops across the rectifying devices and output filter inductors such as weighted voltage control and the frequency modulation (FM) coupled with pulse width modulation (PWM) method. These techniques, however, are not without drawbacks. The former control method does not eliminate cross regulation errors but rather redistribute the errors in a controlled manner so designers have the freedom to choose which output is more tightly controlled than the other. The latter can eliminate cross regulation error by introduce another control variable the switching frequency in addition to PWM control. It requires variable frequency control and discontinuous conduction mode operation, both of which are highly undesirable in many applications.

Schlecht disclosed a new circuit in U. S. Pat. No. 5,999, 417 that can be used to implement multiple output converters by adding another secondary winding on each transformer as shown in FIG. 3. The converter 300 takes an input voltage 302 and creates a first and second output voltage 304, 306. The front end of the circuit includes a first and second switch 308, 310, a capacitor 312 and an inductor 314. These components are collectively referred to as a "buck converter" 316. The buck converter establishes an intermediate bus voltage, at point 318. Two power transformers 320, 322 are placed in cascade with the buck converter. Each power transformer 320, 322 is connected to switch 324, 326 respectively. Switching on and off the switches create a AC voltage across each transformer's primary winding. The induced voltage across the secondary windings are rectified by the secondary rectifying devices, thus a DC voltage been established at each output. The advantage of this circuit is that it has all the magnetic components on the primary side and therefore has better cross regulation and higher efficiency compared with the converters of FIG. 1 and FIG. 2. One drawback though is that it has to use two transformers and implementation is relatively complicated.

In light of the problems and drawbacks associated with the prior arts, what is needed is a circuit that can provide tightly regulated outputs with relatively simple structure.

SUMMARY OF THE INVENTION

The present invention relates to a new set of dc-to-dc converter topologies. The basic circuit common to each embodiment includes a buck converter to provide an intermediate bus voltage, a double-ended circuit, a single power transformer and at least one output voltage circuit. The new converters are tightly regulated and provide consistent voltage levels even when one output voltage circuit is experiencing a high load. The new converter designs are also highly efficient. They contain fewer active and passive elements than prior art converters and avoid unnecessary duplication of parts.

The front end of the circuit is a buck converter. Buck converters are well known in the art and are used to provide an intermediate bus voltage. A double-ended circuit is then used to couple the buck converter to a power transformer. The double-ended circuit can be either a full bridge circuit, or a push-pull circuit. The full bridge circuit is the preferred embodiment. It includes two pair of switches, each pair operating at a fixed duty cycle, typically an approximately 50% duty cycle. The first pair of switches operate out of phase with a second pair of switches. Further, either pair of switches comprises a first switch on a first terminal of the primary winding a second switch on a second terminal of the primary winding.

The power transformer has a primary and a secondary winding. In one embodiment, a single secondary winding is used. In another embodiment, two secondary windings are used. An output voltage circuit is coupled to each. In another embodiment, a single secondary winding is used with two output voltage circuit coupled to different terminals on the secondary winding. The output voltage circuits use rectifying devices, either rectifying diodes or rectifying switches. Additional drive windings can be used between the rectification switches and the secondary windings. Further, additional bias voltage circuits can be coupled to the power transformer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
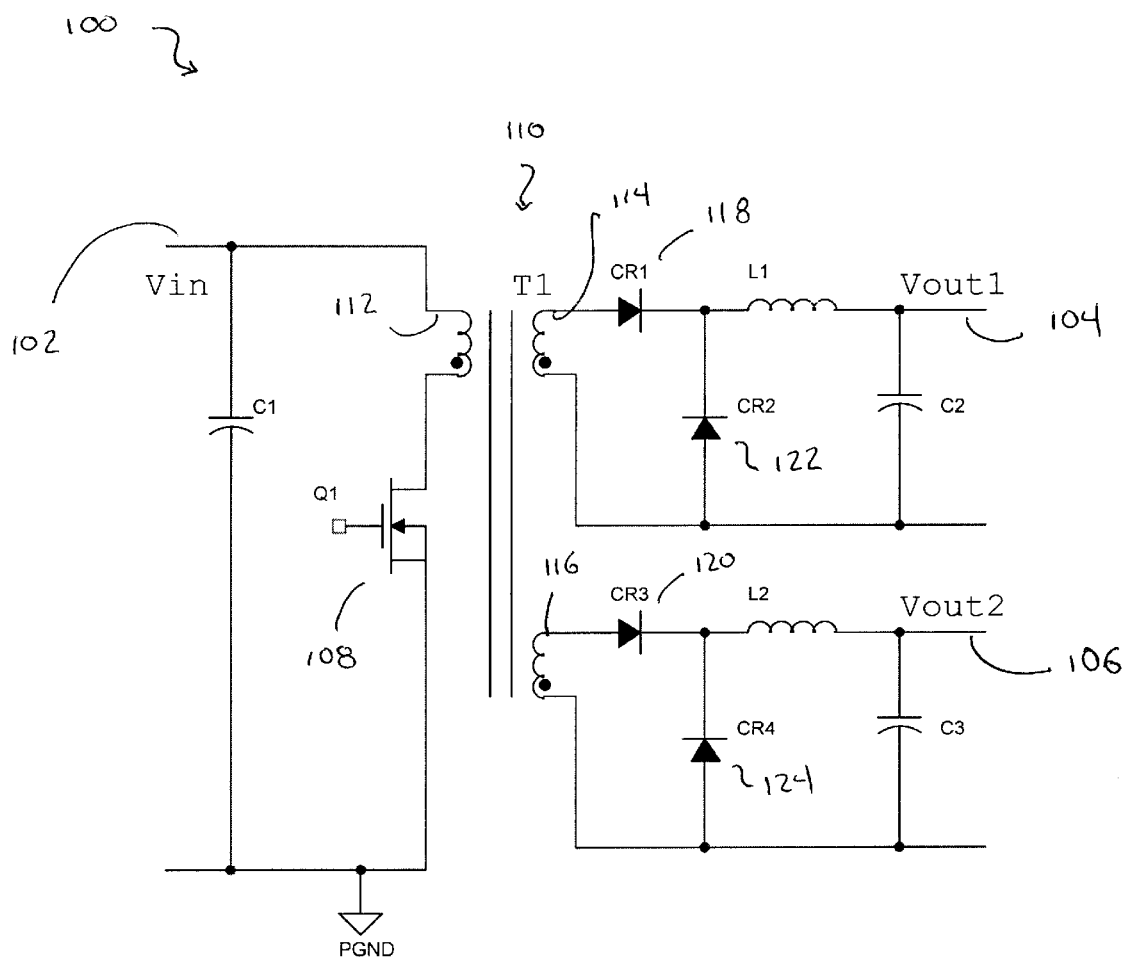
FIGS. 1 and 2 are schematic diagrams of prior art DC-to-DC converters.
Figure 2:
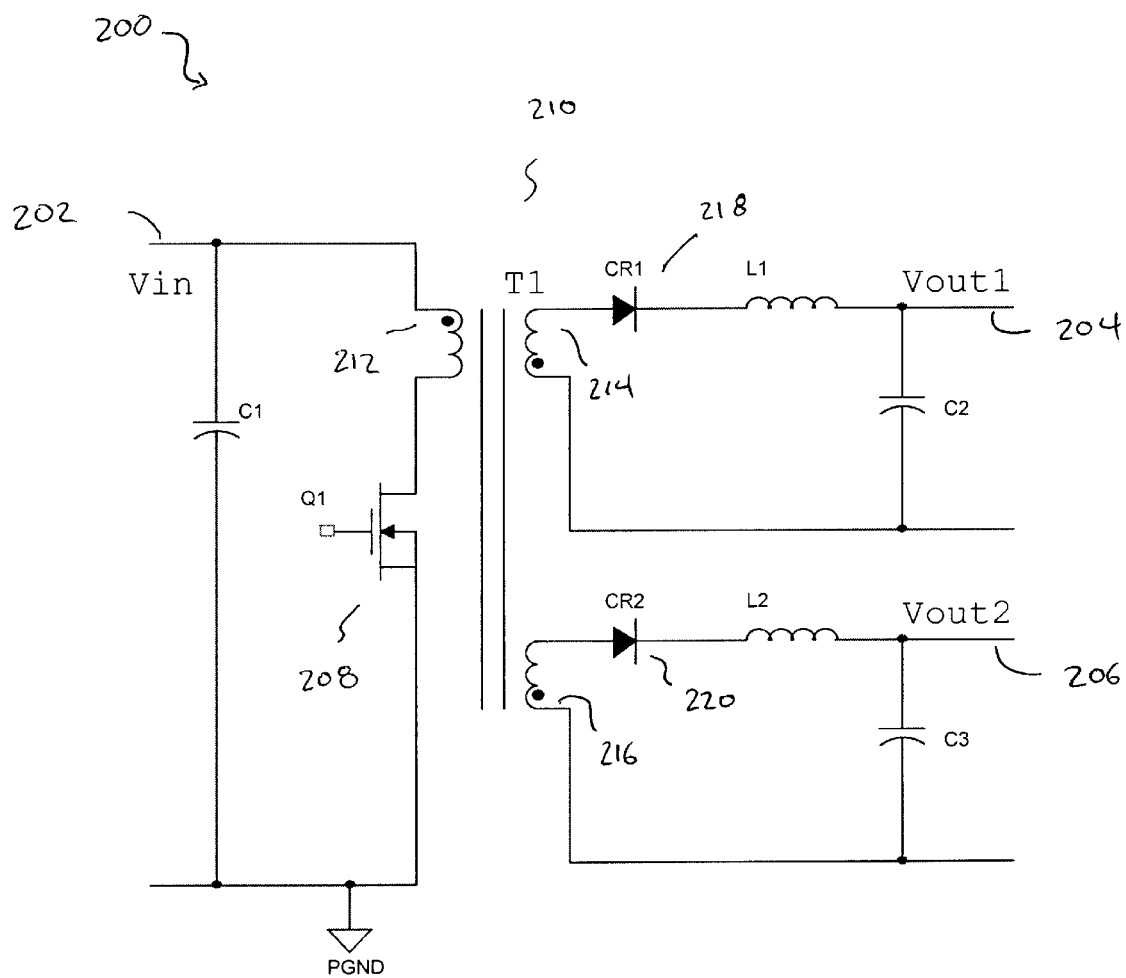
Figure 3:
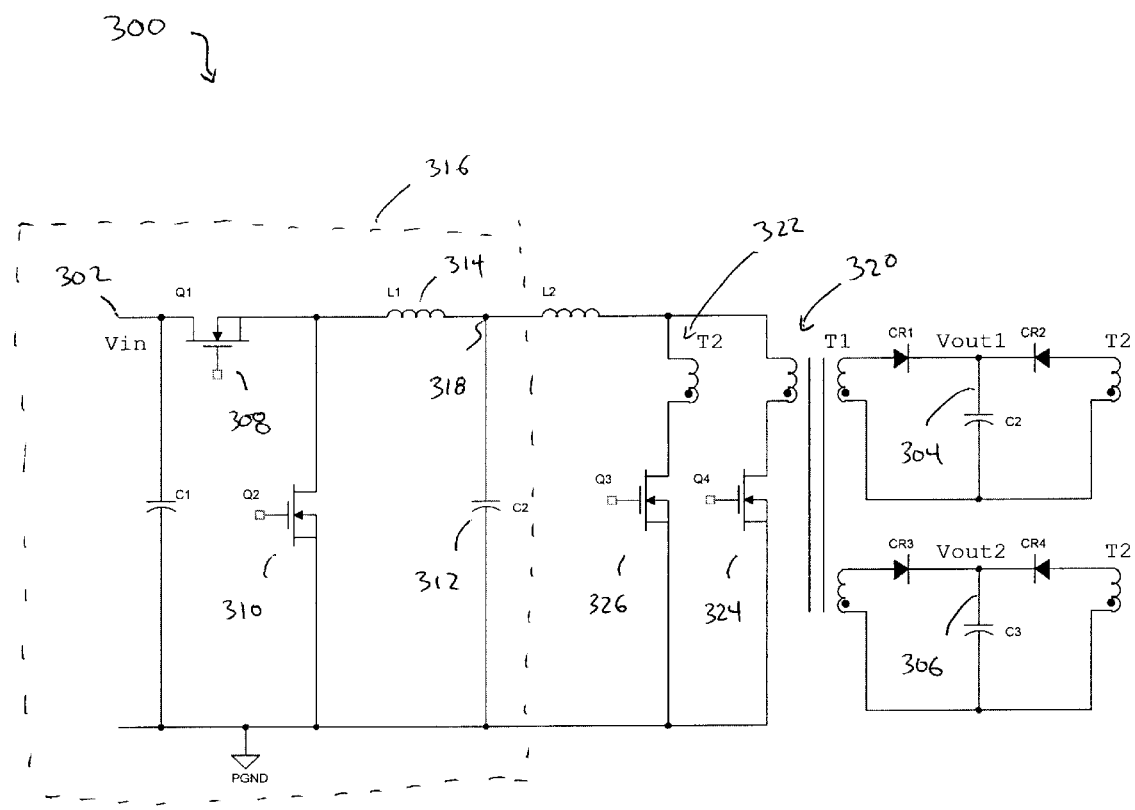
FIG. 3 is a schematic diagram of a prior art DC-to-DC converter having a buck converter to supply an intermediate bus voltage to two power transformers.
Figure 4A:
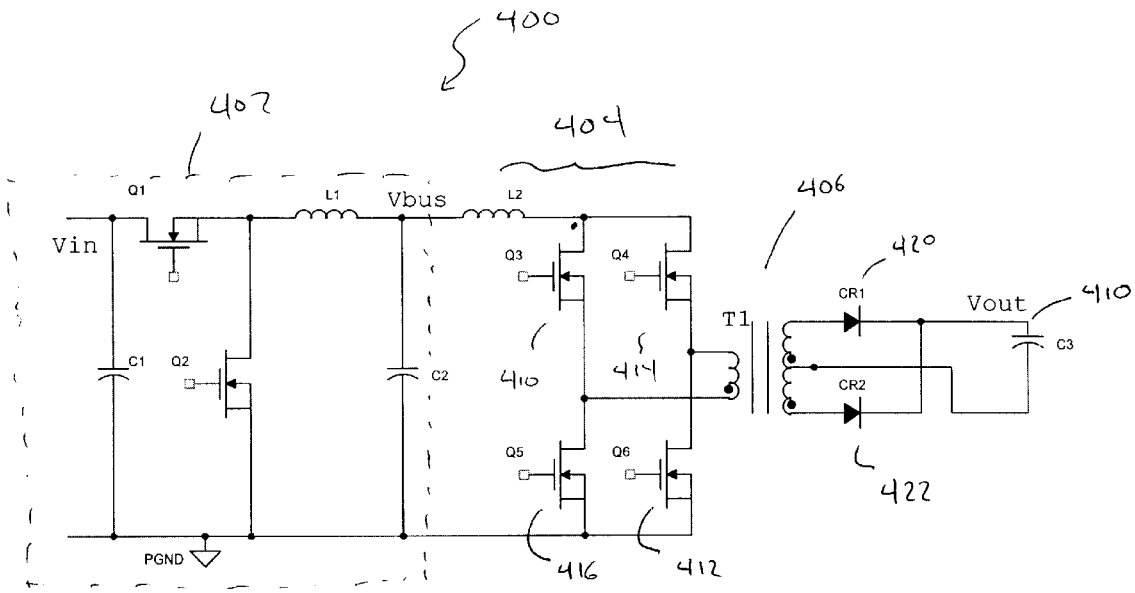
FIGS. 4A and 4B are DC-to-DC converters using a full bridge or push pull topology in cascade with a buck converter and thus embodies the basic embodiment of the present invention.

FIG. 4A illustrates a DC-to-DC converter 400 implemented using a buck converter 402 followed by a double-ended converter which can be either a full bridge 404 or a push-pull topology. To illustrate the concept of the invention, the full bridge circuit is discussed hereinafter. The same operation principle can be applied to the push-pull circuit with very minor design changes. Those who are skilled in the art should realize that the following description can be extended easily to the push-pull circuit without deviation of the spirit of the concept proposed here. The full bridge circuit includes two pair of switches 410/412, and 414/416. When switches 410/412 are on, switches 414/416 are off. Thus, current will flow through switch 410, through the primary winding of power transformer 406 and through switch 412. The switches are controlled by the same signal and timed to a fixed duty cycle. The duty cycle is preferably a 50% duty cycle, but could be approximately 50%. In other words, for certain applications, the duty cycle could be varied to as much as 45% to 55%.

The buck converter 402 establishes a well-regulated bus voltage while the bridge circuit 404 acts like a DC/DC transformer by operating all the bridge switches with the fixed duty cycle. The filter inductor is on the primary side and therefore the power loss is extremely low at the secondary side especially for low output voltage with high current applications. The secondary circuit has only rectifiers 420, 422 that can be either diodes or active switches. This circuit features simple control, high efficiency and easy driving since the bridge is operating at 50% duty cycle. The only control signals needed are for the buck switches Q1 and Q2.

In the above description, the synchronized operation between the buck converter and the double-ended converter is not specifically required. In practical design, however, it is often desirable to have the operation of the buck converter in synchronization with the following double-ended converter if the operating frequencies are close to each other.

Figure 4B:
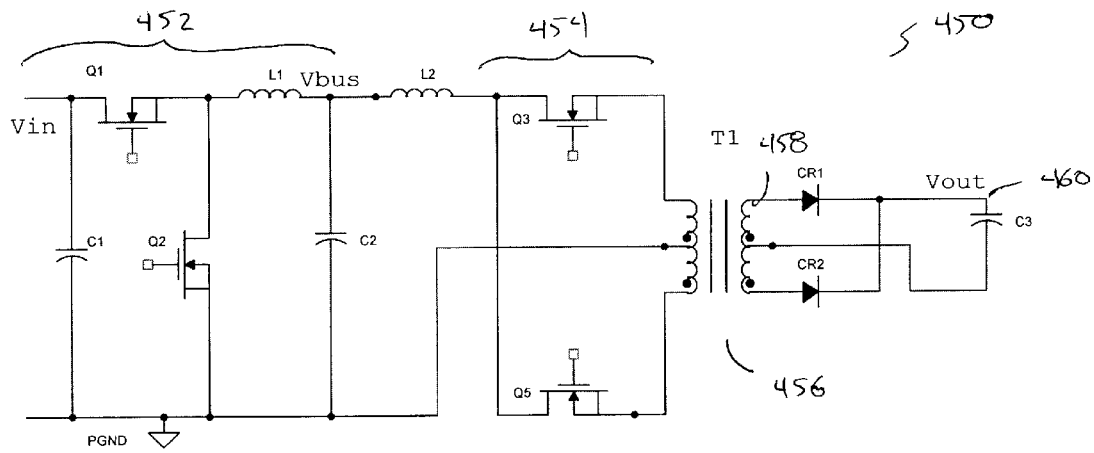

FIG. 4B illustrates a similar circuit 450 with a push-pull bridge circuit 454.

Figure 5:
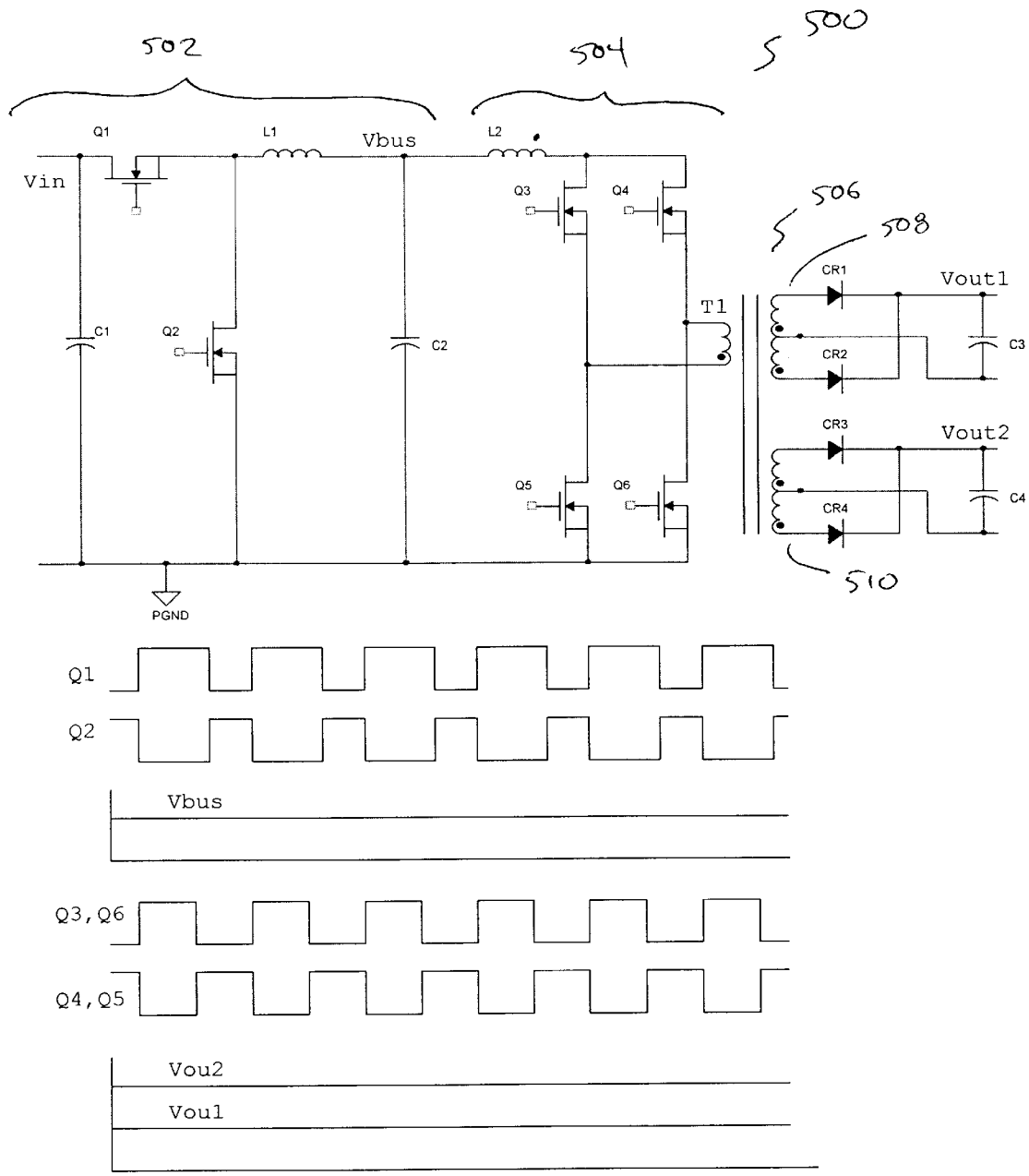
FIG. 5 is a DC-to-DC converter similar to FIG. 4 except that it includes two output voltage circuits.

FIG. 5 extends the circuit in FIG. 4 to a dual output converter 500 by adding another winding to the secondary. The power transformer 506 has a first secondary winding 508 and a second secondary winding 510. Switches Q1 and Q2, inductor L1 and capacitor C2 form a buck converter 502, establishing an intermediate bus voltage. Switches Q3, Q4, Q5, and Q6, and inductor L2 form a current fed bridge circuit 504. Further switches Q3, Q4, Q5, and Q6 operate at 50% duty cycle. The rectified secondary voltages are directly fed to the outputs without extra inductors. The output voltage is simply the intermediate bus voltage times the transformer's turns ratio. Since there are no inductors on the secondary sides, the voltage differences caused by the inductors are eliminated. If synchronous rectifiers are used, the voltage drops across the rectifiers are further reduced, and therefore the output voltages are tightly cross-regulated. Another advantage of this circuit is that there is only one power transformer 506 needed in the circuit, thus reducing parts count and simplifying the overall structure.

The output voltage regulation can be achieved by using various feedback control methods. A simple control method is to sense one of the output voltages and feedback the error signal to the controller. The unsensed output is cross-regulated. Another control method is to use weighted voltage model control. The feedback signal is derived from the weighted sum of the output voltages. Elimination of the secondary filter inductors reduces cross regulation errors greatly compared with what presented in the aforementioned prior art embodiments.

Figure 6:
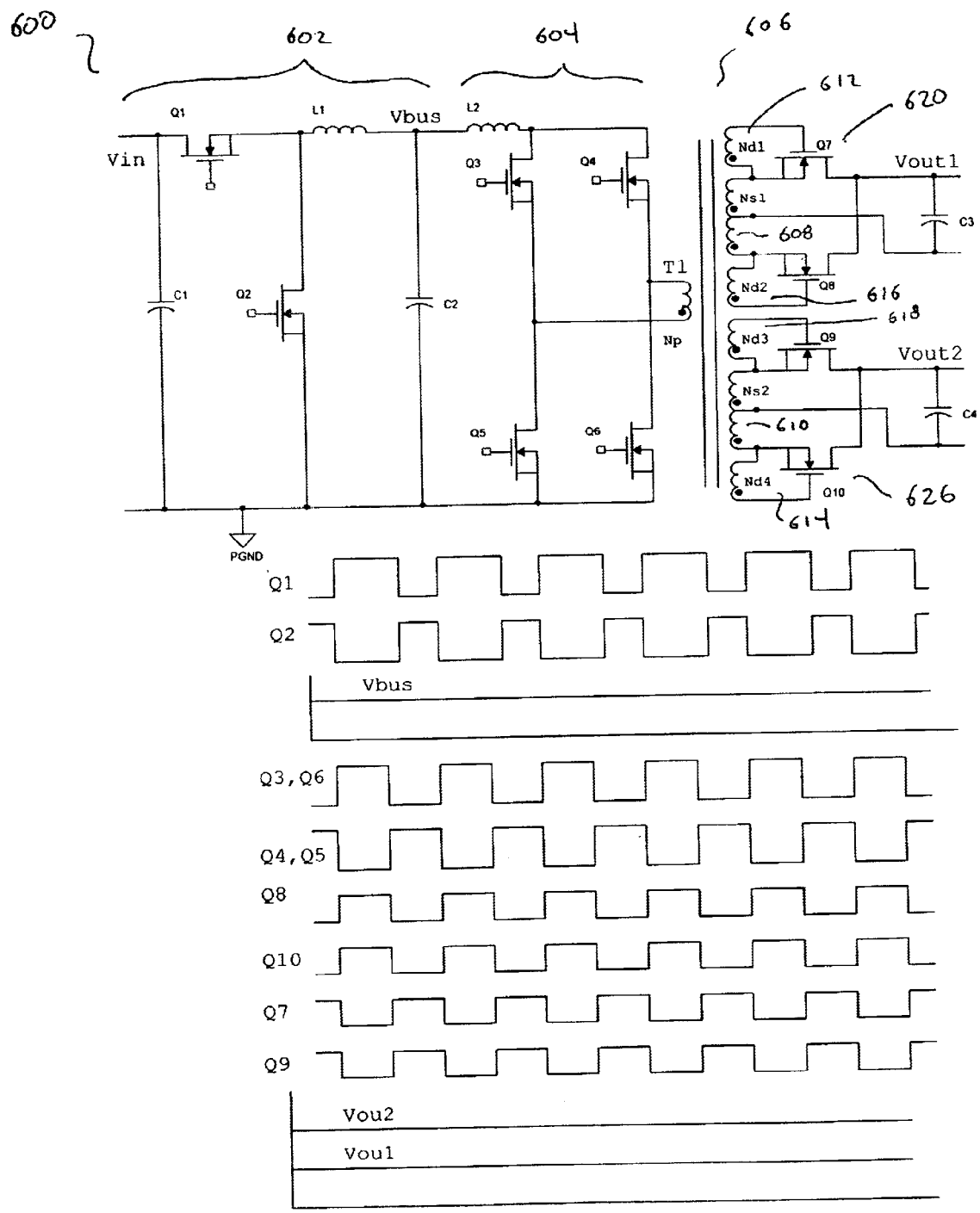
FIG. 6 is a DC-to-DC converter similar to FIG. 5 except that it uses self-driven synchronous rectification instead of rectifying diodes.

FIG. 6 presents a DC-to-DC converter 600 using synchronous rectification instead of rectifying diodes on the secondary. The secondary synchronous rectifier MOSFETs can be either self-driven or externally driven. For the self-driven version as shown in the figure extra windings 612, 614, 616, 618 (Nd1, Nd2, Nd3, and Nd4) are added to the power transformer 606, providing drive voltage for the synchronous rectifier MOSFETs 620, 622, 624, 626

(Q7–Q10). It is noted that the energy stored in the gate of MOSFETs is recovered each time when the voltage across the power transformer T1 changes polarity, providing lossless gate drive to all the synchronous rectifier MOSFETs.

Figure 7:
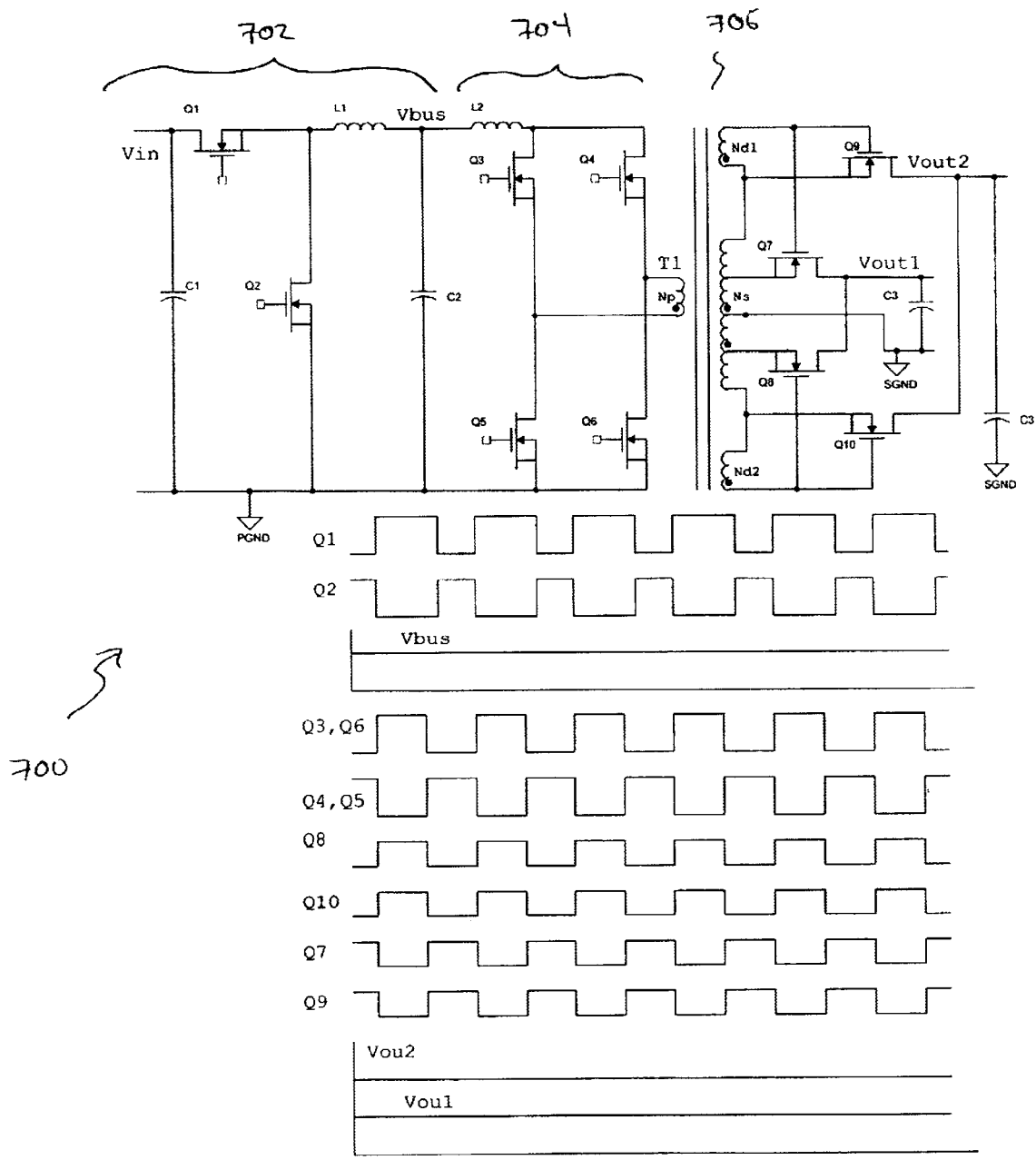
FIG. 7 is a DC-to-DC converter similar to FIG. 6 except that it uses a single secondary winding and two drive windings for the synchronous rectification.

If both outputs are referenced to the same secondary ground, the secondary windings can be rearranged to simplify the circuit. FIG. 7 illustrates this simplified version of the proposed multiple output DC/DC converter 700 using a buck converter 702 followed by a full bridge topology 704 with self-driven synchronous rectifiers. The winding for Vout2 is stacked with the Vout1 winding. Stacking up the windings simplifies the power transformer design. When the converter is operating under extreme conditions, i.e., one at full load and the other at light load, no windings are idling. Better yet the synchronous rectifier FETs share windings Nd1 and Nd2 for generating driving signals. The total number of windings on the power transformer is further reduced. The transformer design is greatly simplified.

The circuit demonstrated in FIG. 7 can be modified to generate bias voltages for the both primary and secondary control circuits as shown in FIG. 8. FIG. 8 shows a multiple output DC/DC converter 800 formed by a buck converter followed by a full bridge converter. The second output shares part of the winding of the first output. Secondary synchronous rectification is implemented by using MOSFETs. Npcc, CR1, and CR2 provide the first bias voltage Vcc1. The second bias voltage Vccs can be obtained in the same way. Here a different implementation, however, is presented. CR1 and CR2 are added to the circuit. After rectification through CR1 and CR2, the gate drive voltage derived from Nd1 and Nd2 for the secondary synchronous rectifier MOSFETs is converted to a DC voltage, Vccs, powering the secondary control circuitry.

Those skilled in the art should understand that the previously described embodiments of the synchronous rectifier control scheme are submitted for illustrative purposes only and other embodiments thereof are well within the scope and spirit of the present invention. Although the present invention has been described in detail, those skilled in the art should understand that they can make various changes, substitutions and alterations herein without departing from the spirit and scope of the invention in its broadest form.

We claim:

1. A dc-to-dc converter comprising:
   (a) a buck converter having an input voltage and an intermediate bus voltage;
   (b) a double-ended circuit in cascade through an inductor with the buck converter;
   (c) a power transformer having a primary winding coupled to the double-ended circuit and two secondary windings;
   (d) a first pair of rectifying diodes coupled to the first secondary winding and producing a first output voltage; and
   (e) a second pair of rectifying diodes coupled to the second secondary winding and producing a second output voltage.

2. The dc-to-dc converter of claim 1 wherein the double-ended circuit is a full bridge circuit comprising two pair of switches, each pair operating at a fixed duty cycle.

3. The dc-to-dc converter of claim 2 wherein the fixed duty cycle comprises an approximately 50% duty cycle.

4. The dc-to-dc converter of claim 1 wherein the double-ended circuit comprises a first pair of switches operating out of phase with a second pair of switches.

5. The dc-to-dc converter of claim 2 wherein either pair of switches comprises a first switch on a first terminal of the primary winding a second switch on a second terminal of the primary winding.

6. The dc-to-dc converter of claim 1 wherein the double-ended circuit is a push-pull circuit.

7. A dc-to-dc converter comprising:
   (a) a buck converter having an input voltage and an intermediate bus voltage;
   (b) a double-ended circuit in cascade through an inductor with the buck converter;
   (c) a power transformer having a primary winding coupled to the double-ended circuit and a plurality of secondary windings;
   (d) a first pair of synchronous rectifier switches coupled to a first secondary winding;
   (e) a second pair of synchronous rectifier switches coupled to a second secondary winding.

8. The dc-to-dc converter of claim 7 further comprises:
   a synchronous rectification circuit having a drive winding coupled to the power transformer and coupled across the control terminals of the synchronous rectifier switch.

9. The dc-to-dc converter of claim 8 wherein the drive winding is coupled across the gate and source of a MOSFET.

10. The dc-to-dc converter of claim 8 wherein the double-ended circuit is a full bridge circuit comprising two pair of switches, each pair operating at a fixed duty cycle.

11. The dc-to-dc converter of claim 8 wherein the double-ended circuit comprises a fixed duty cycle comprises an approximately 50% duty cycle.

12. The dc-to-dc converter of claim 8 wherein the double-ended circuit comprises a first pair of switches operating out of phase with a second pair of switches.

13. The dc-to-dc converter of claim 8 wherein a positive voltage across the control terminal of the synchronous rectifier switch turns the switch to an "on" state.

14. The dc-to-dc converter of claim 8 further comprises a first and second output circuits for producing a first and second output voltage and wherein each of said output circuits have a pair of synchronous rectifier switches.

15. The dc-to-dc converter of claim 8 wherein the first pair of synchronous rectifier switches are out of phase.

16. The dc-to-dc converter of claim 8 wherein each synchronous rectifier switch is self driven.

17. The dc-to-dc converter of claim 8 wherein each synchronous rectifier switch is externally driven.

18. The dc-to-dc converter of claim 9 wherein the double-ended circuit is a push-pull circuit.

19. A dc-to-dc converter comprising:
   (a) a buck converter having an input voltage and an intermediate bus voltage;
   (b) a double-ended circuit in cascade through an inductor with the buck converter;
   (c) a power transformer having a primary winding and a secondary winding, wherein the secondary winding has multiple terminals;
   (d) a pair of drive windings coupled to the power transformer; and
   (e) a first pair of rectifier switches coupled between terminals on the secondary winding and the drive windings.

20. The dc-to-dc converter of claim 19 wherein the first pair of rectifier switches are out of phase.

21. The dc-to-dc converter of claim 19 further comprises:
   a second pair of rectifier switches coupled between terminals of the secondary winding and the drive windings producing a second output voltage.

22. The dc-to-dc converter of claim 19 wherein the double-ended circuit is a full bridge circuit comprising two pair of switches, each pair operating at a fixed duty cycle.

23. The dc-to-dc converter of claim 22 wherein the fixed duty cycle comprises an approximately 50% duty cycle.

24. The dc-to-dc converter of claim 19 wherein the double-ended circuit comprises a first pair of switches operating out of phase with a second pair of switches.

25. A dc-to-dc converter comprising:
   (a) a buck converter having an input voltage and an intermediate bus;
   (b) a double-ended circuit in cascade through an inductor with the buck converter;
   (c) a power transformer having a primary winding and a secondary winding, wherein the secondary winding has multiple terminals;
   (d) a pair of drive windings coupled to the power transformer;
   (e) a first pair of rectifier switches coupled between terminals on the secondary winding and the drive windings;
   (f) a second pair of rectifier switches coupled between terminals on the secondary winding and the drive windings; and
   (g) a bias voltage circuit coupled to the power transformer.

26. The dc-to-dc converter of claim 25 further comprises:
   a second bias voltage circuit directly coupled to the drive winding.

27. The dc-to-dc converter of claim 25 wherein the bias voltage circuit comprises:
   a bias voltage winding; and
   a pair of rectifying devices.

28. The dc-to-dc converter of claim 25 wherein the rectifying devices are rectifying diodes.

29. The dc-to-dc converter of claim 25 wherein the rectifying devices are rectifying switches.

30. The dc-to-dc converter of claim 25 wherein the double-ended circuit is a push-pull circuit.

31. The dc-to-dc converter of claim 25 wherein the double-ended circuit is a full bridge circuit comprising two pair of switches, each pair operating at a fixed duty cycle.

32. The dc-to-dc converter of claim 25 wherein the double-ended circuit is a push-pull circuit.

* * * * *

UNITED STATES PATENT AND TRADEMARK OFFICE
CERTIFICATE OF CORRECTION

PATENT NO. : 6,728,118 B1  Page 1 of 1
DATED : April 27, 2004
INVENTOR(S) : Qing Chen et al.

It is certified that error appears in the above-identified patent and that said Letters Patent is hereby corrected as shown below:

Column 2,
Line 24, please change "introduce" to -- introducing --.
Line 43, after "thus a DC voltage", please add -- has --.

Figure 8A:
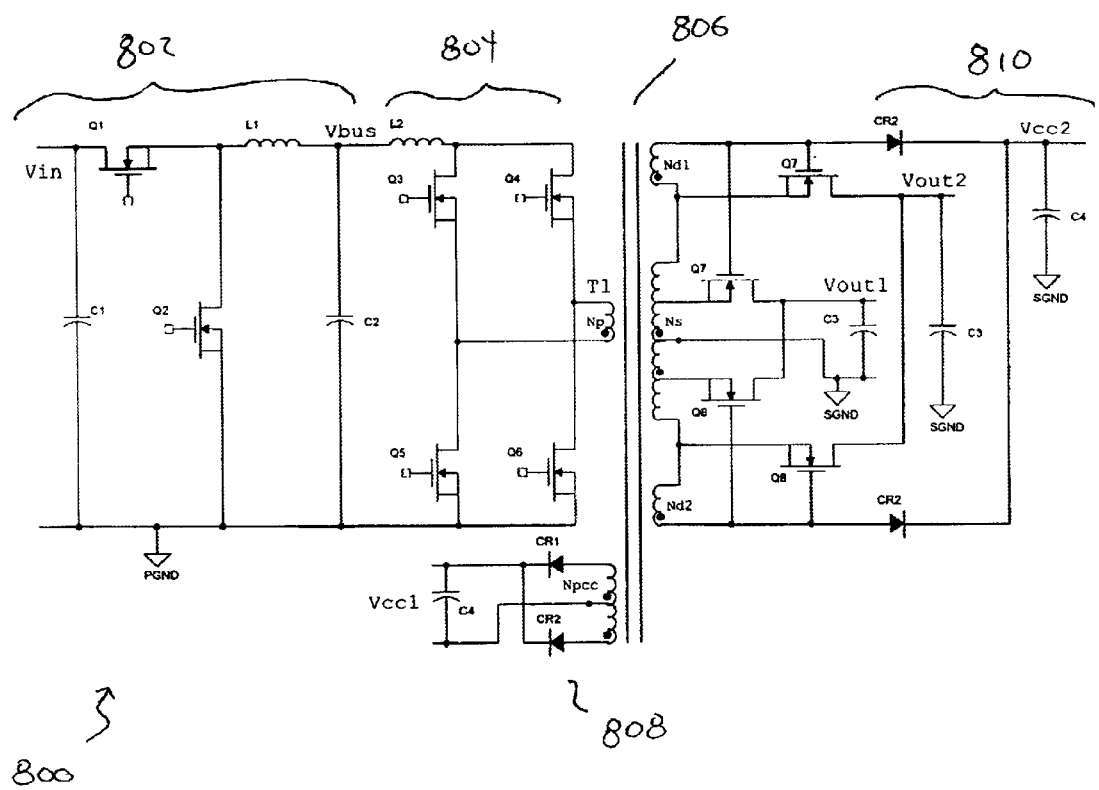
FIG. 8 is a DC-to-DC converter similar to FIG. 7 except that an additional secondary winding is coupled to the power transformer for production of a control voltage $V_{cc}$.
Figure 8B:
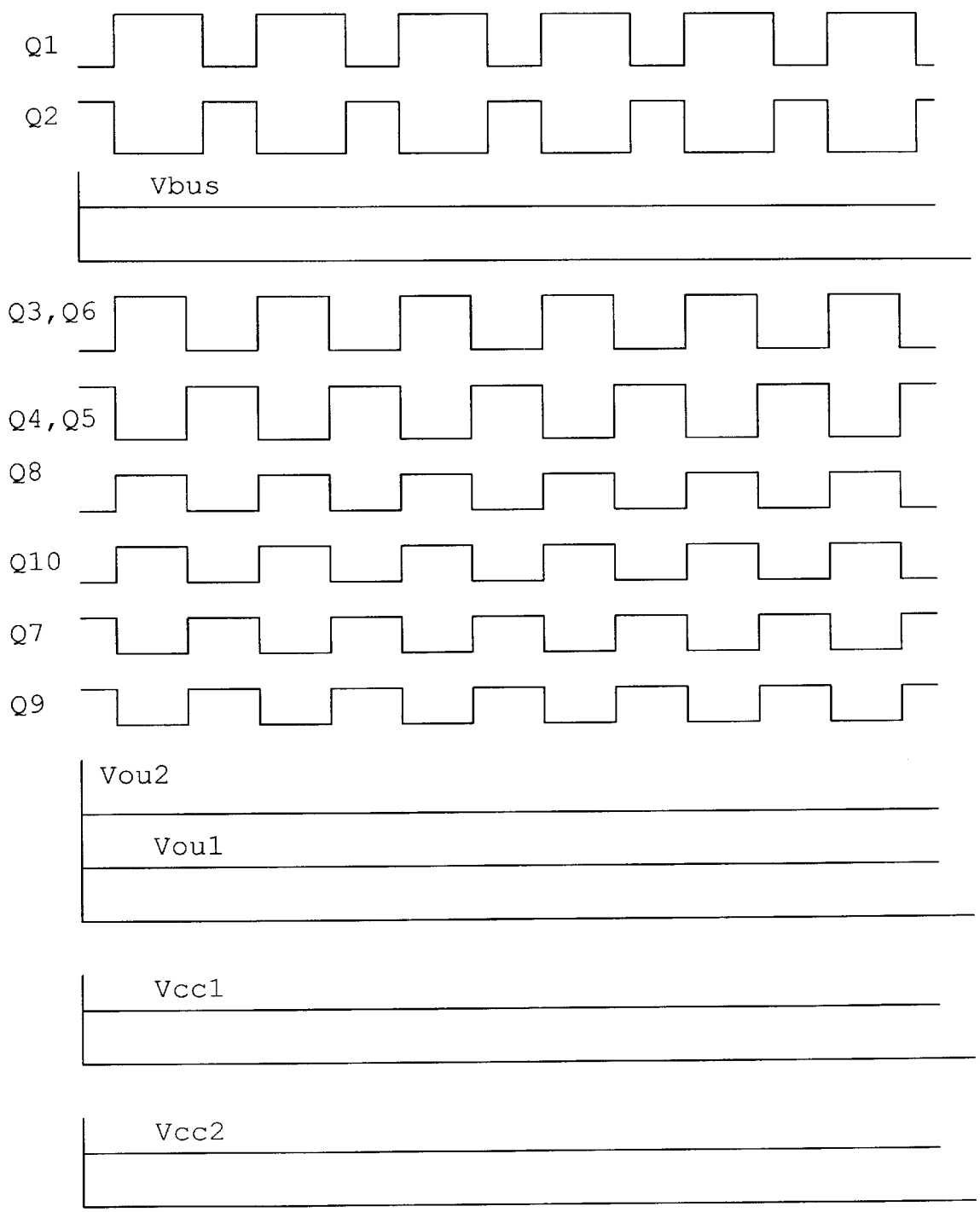

Column 3,
Line 52, please change "FIG. 8" to -- FIG. 8A and FIG. 8B --.

Column 4,
Line 58, after "greatly compared with", please change "what" to -- that --.

Column 5,
Line 21, after "control circuits as shown in", please change "FIG. 8. FIG. 8" to -- FIG. 8A. FIG. 8A --.

Signed and Sealed this

Eleventh Day of January, 2005

JON W. DUDAS
*Director of the United States Patent and Trademark Office*